Aug. 11, 1942. J. J. DILKS, JR 2,292,825
PHOTOGRAPHIC REPRODUCTION APPARATUS
Filed May 12, 1939 12 Sheets-Sheet 1
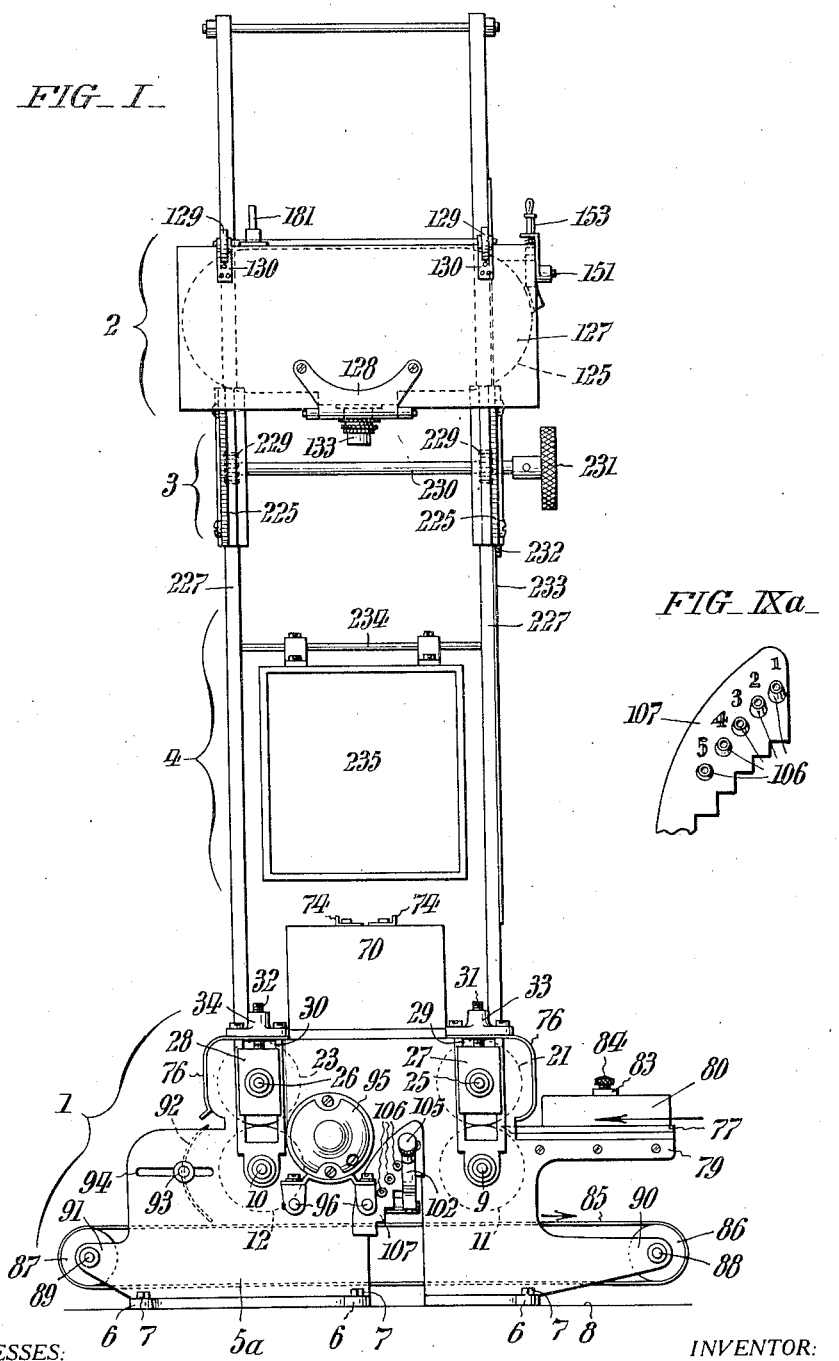
WITNESSES:
Hubert Fuchs
William Bell, Jr.
INVENTOR:
James J. Dilks, Jr.,
BY Paul & Paul
ATTORNEYS.

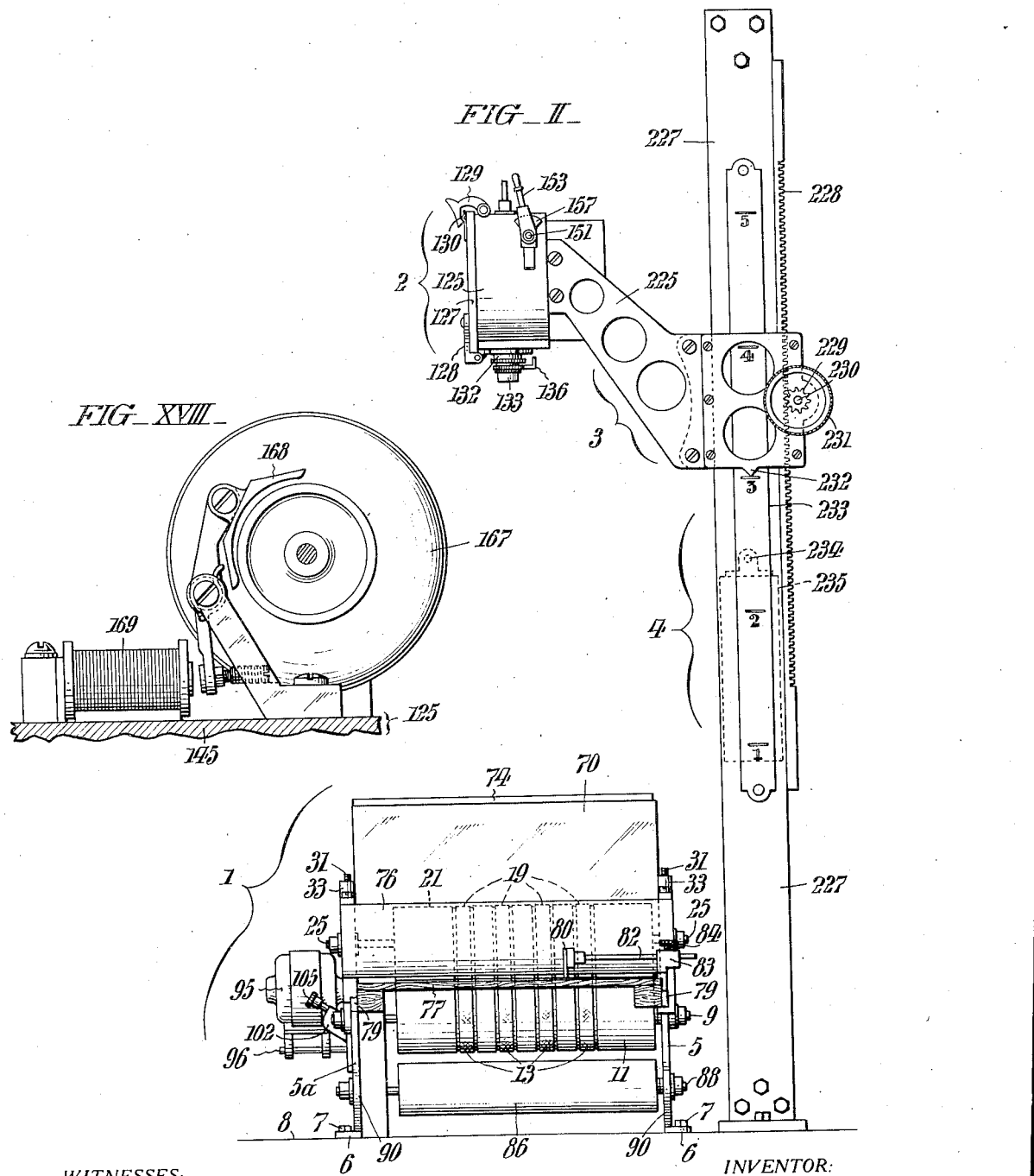

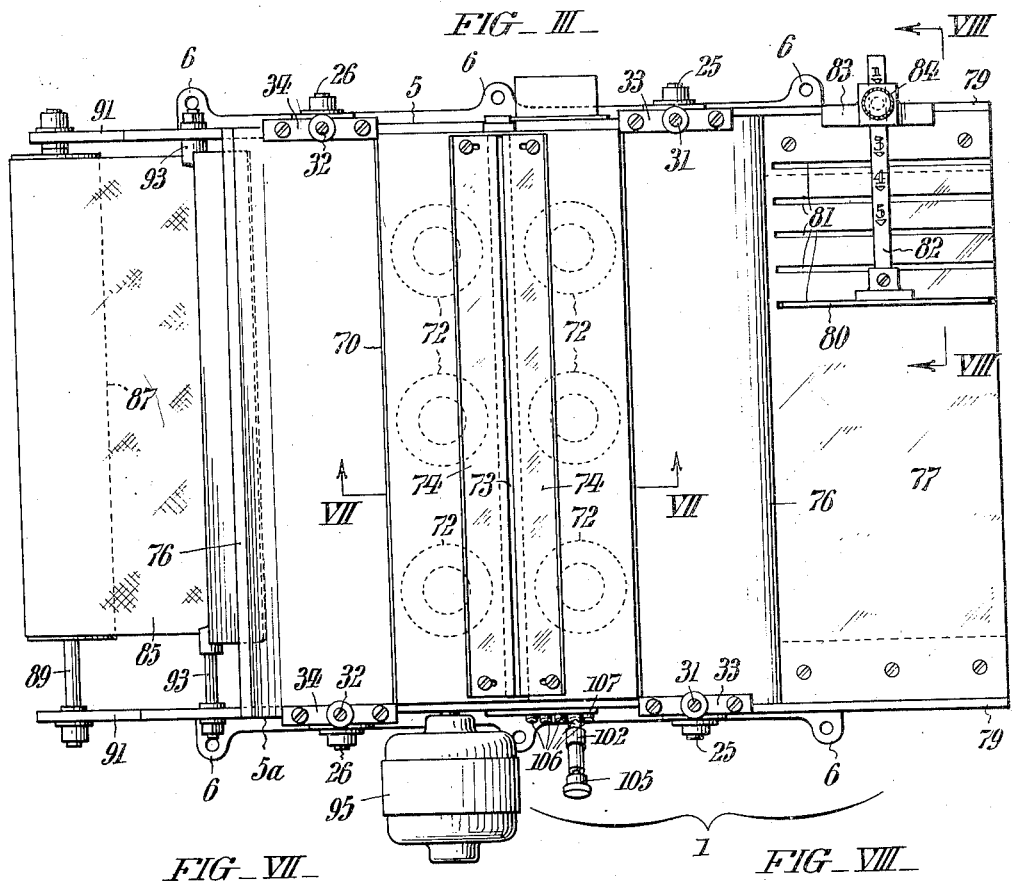

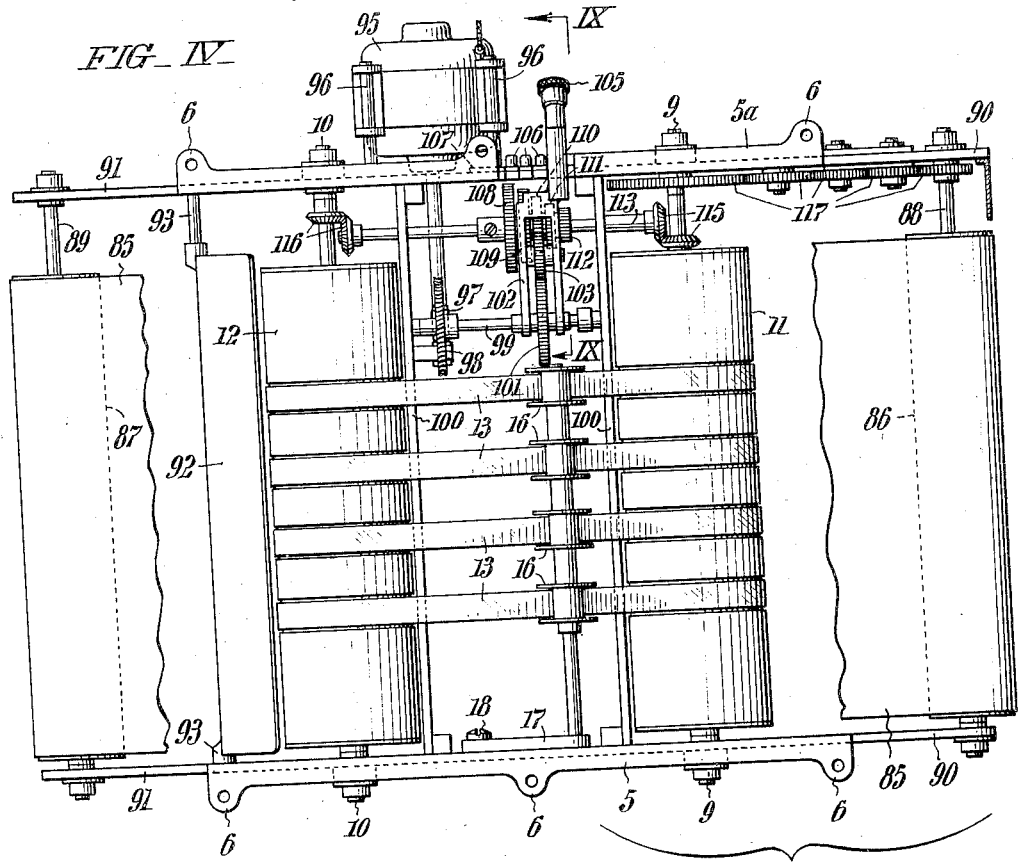
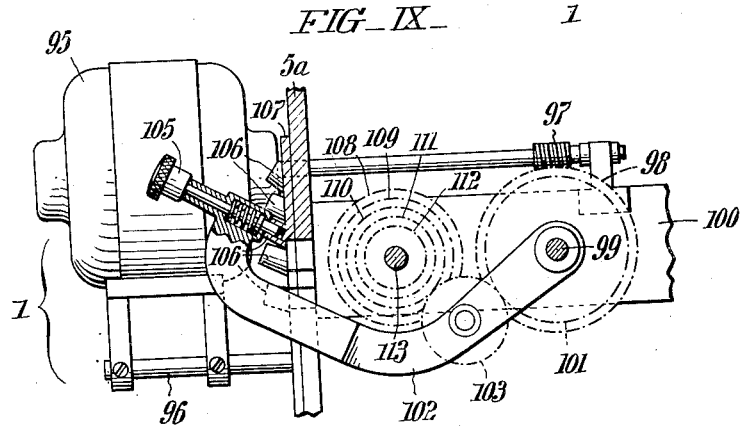

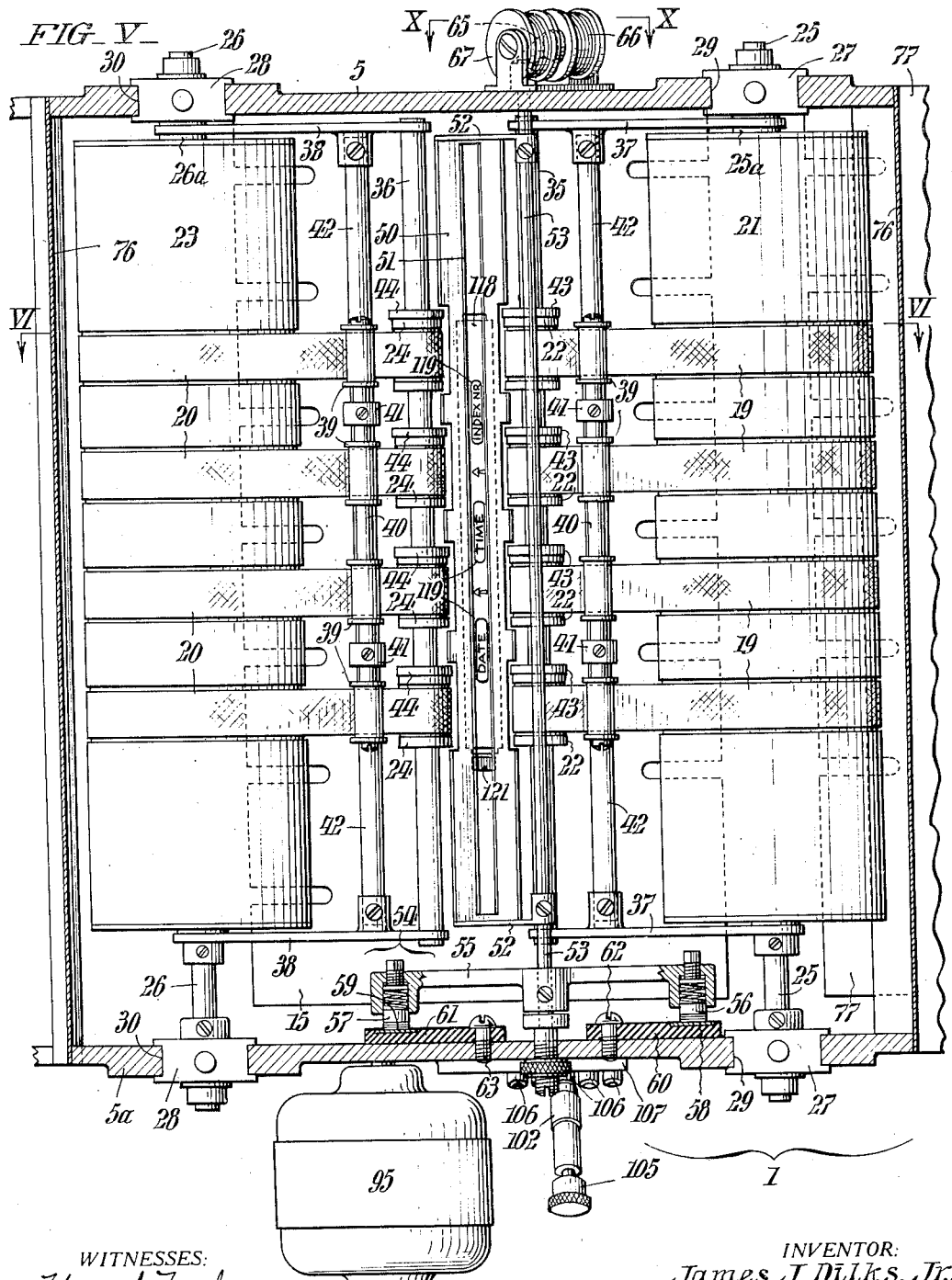

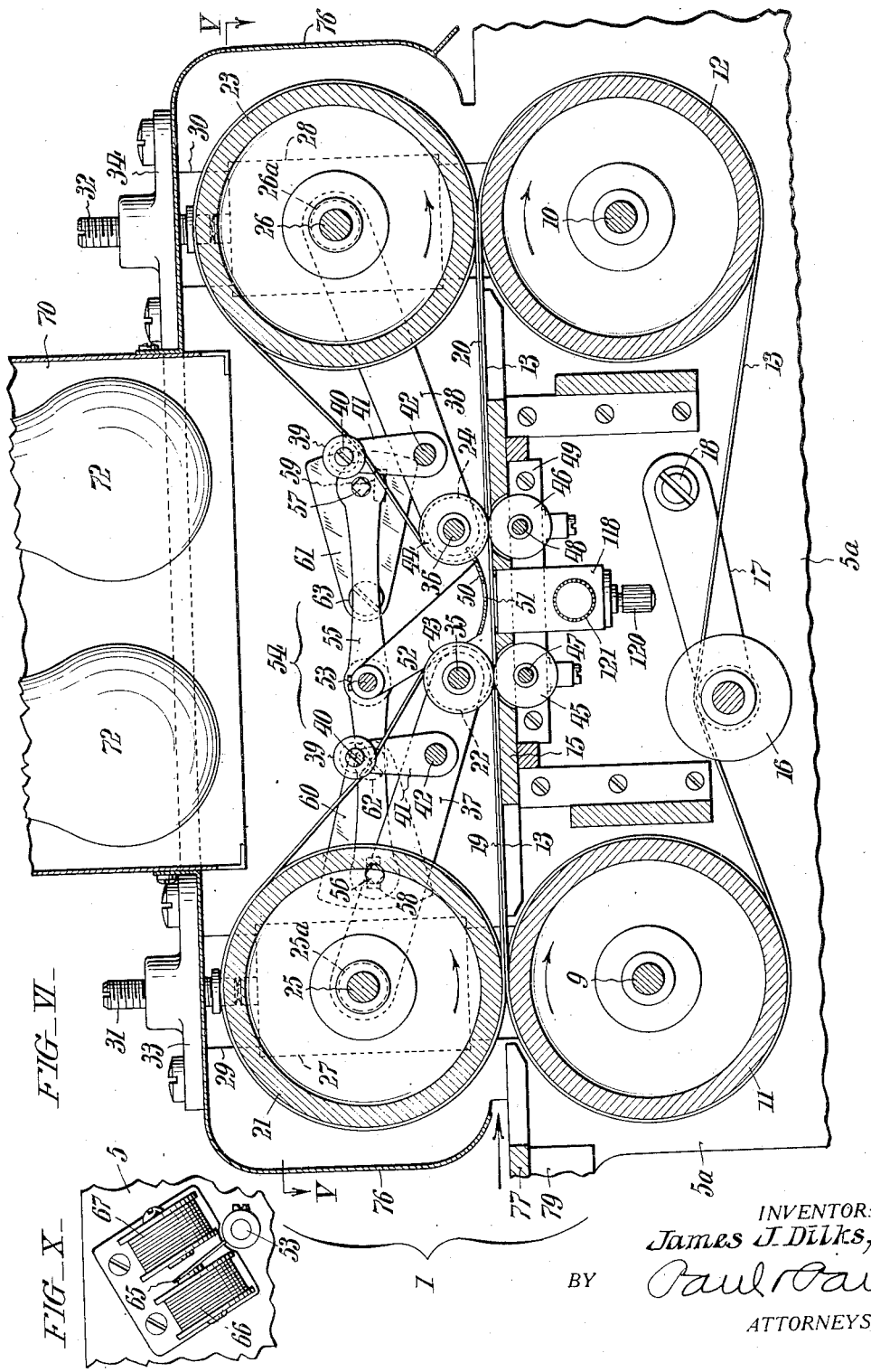

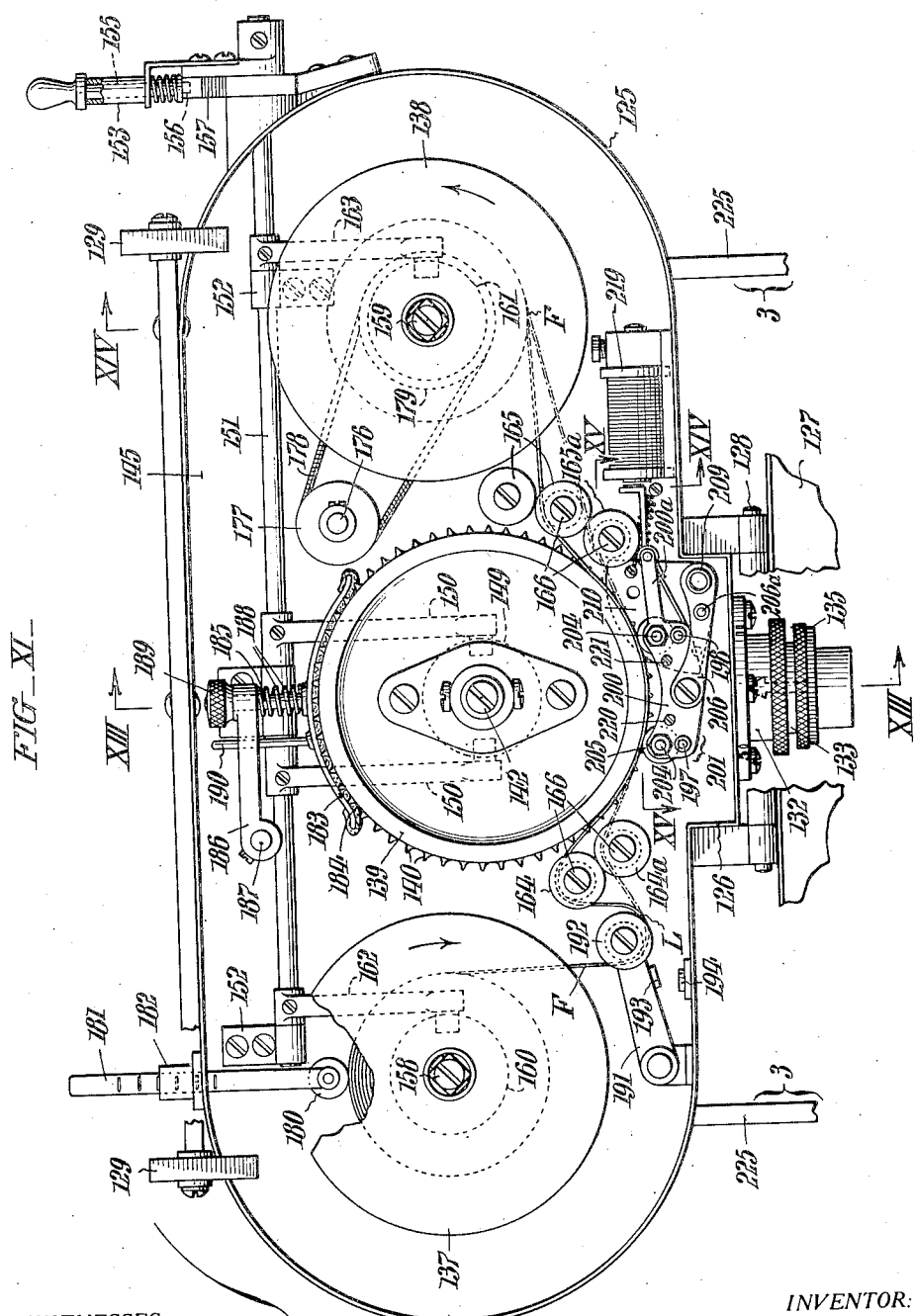

Aug. 11, 1942.                J. J. DILKS, JR                2,292,825
              PHOTOGRAPHIC REPRODUCTION APPARATUS
                    Filed May 12, 1939        12 Sheets-Sheet 8
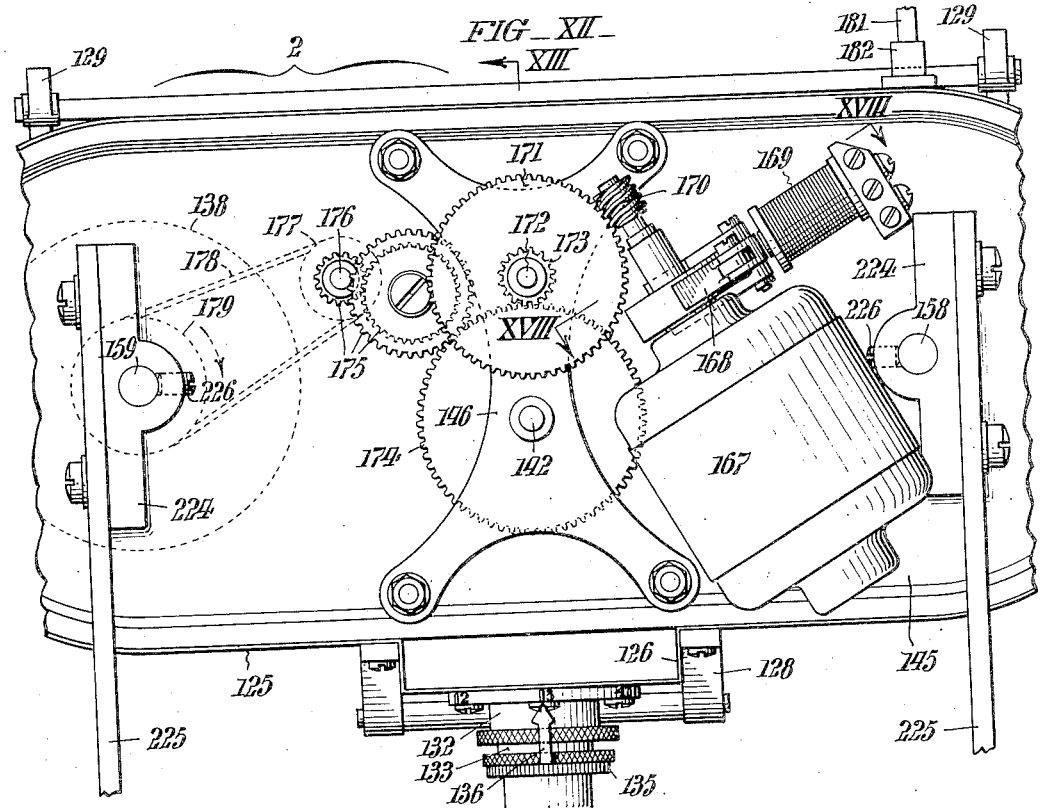
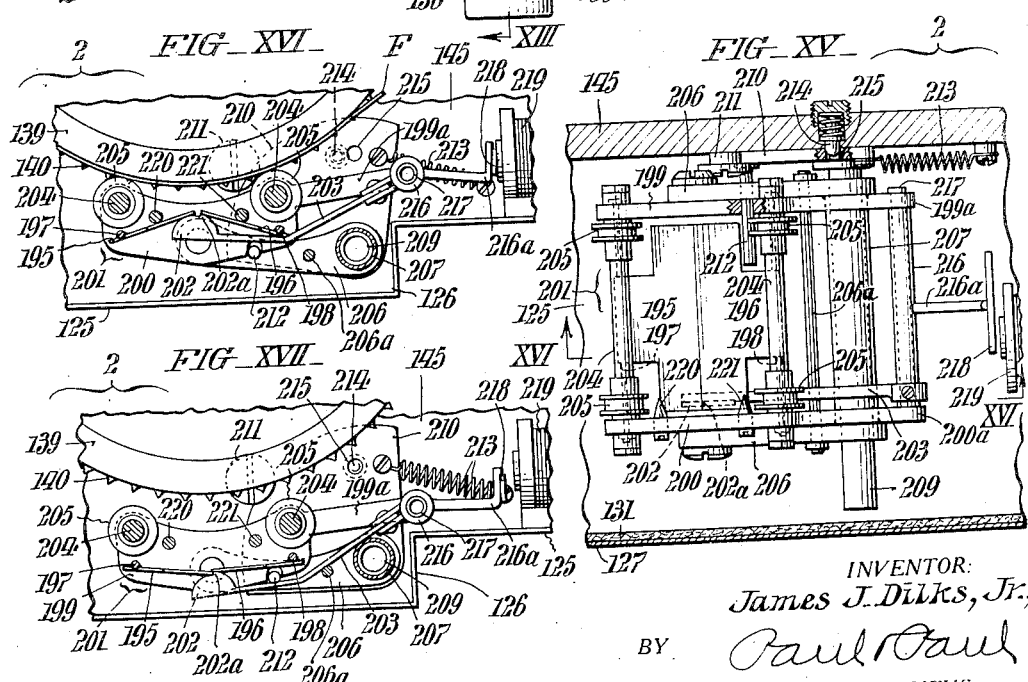
INVENTOR:
James J. Dilks, Jr.,
BY Paul & Paul
ATTORNEYS.

Aug. 11, 1942.  J. J. DILKS, JR  2,292,825
PHOTOGRAPHIC REPRODUCTION APPARATUS
Filed May 12, 1939    12 Sheets-Sheet 9
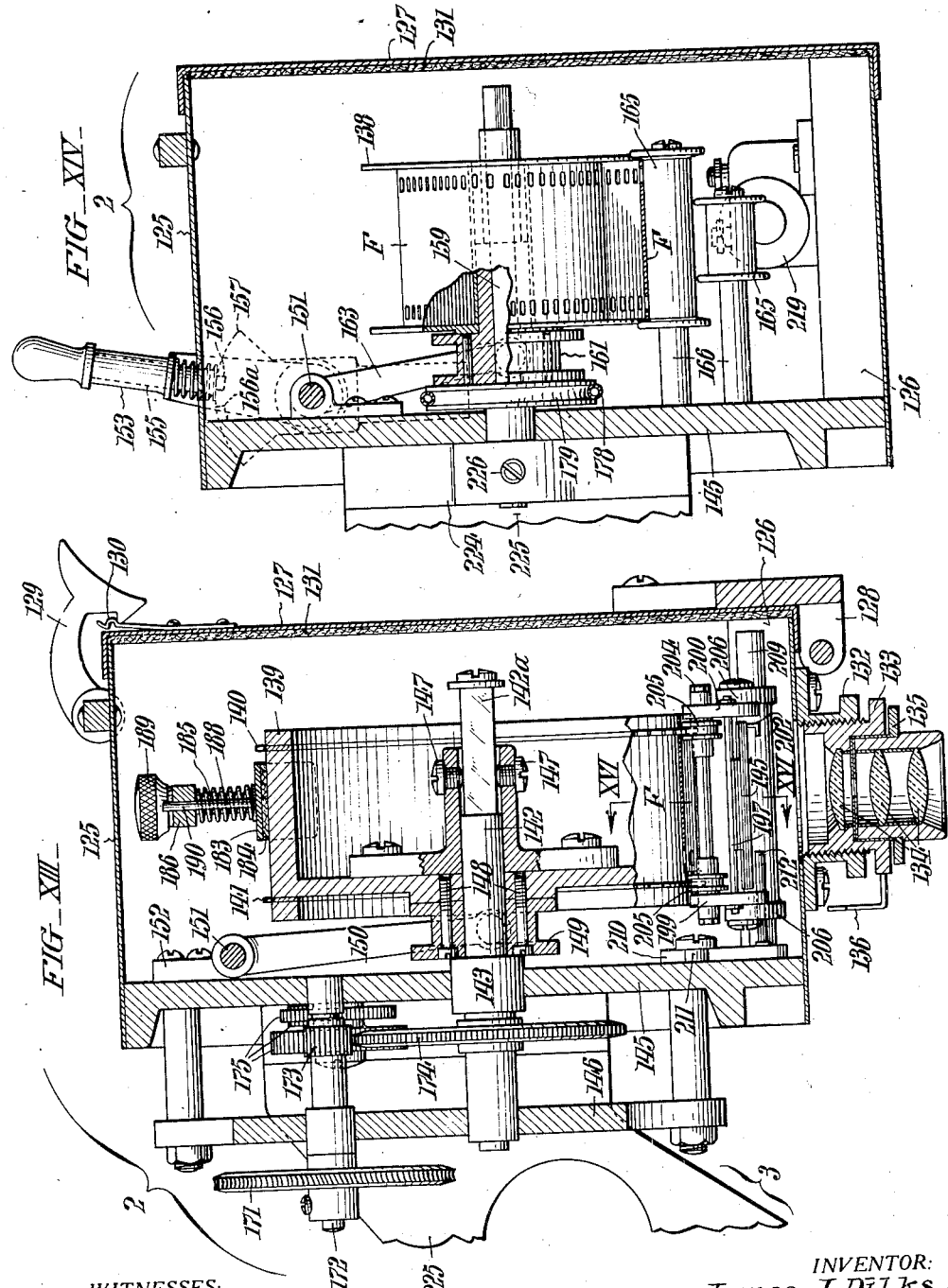
WITNESSES:
Herbert Fuchs
William Bell, Jr.
INVENTOR:
James J. Dilks, Jr.,
BY Paul & Paul
ATTORNEYS.

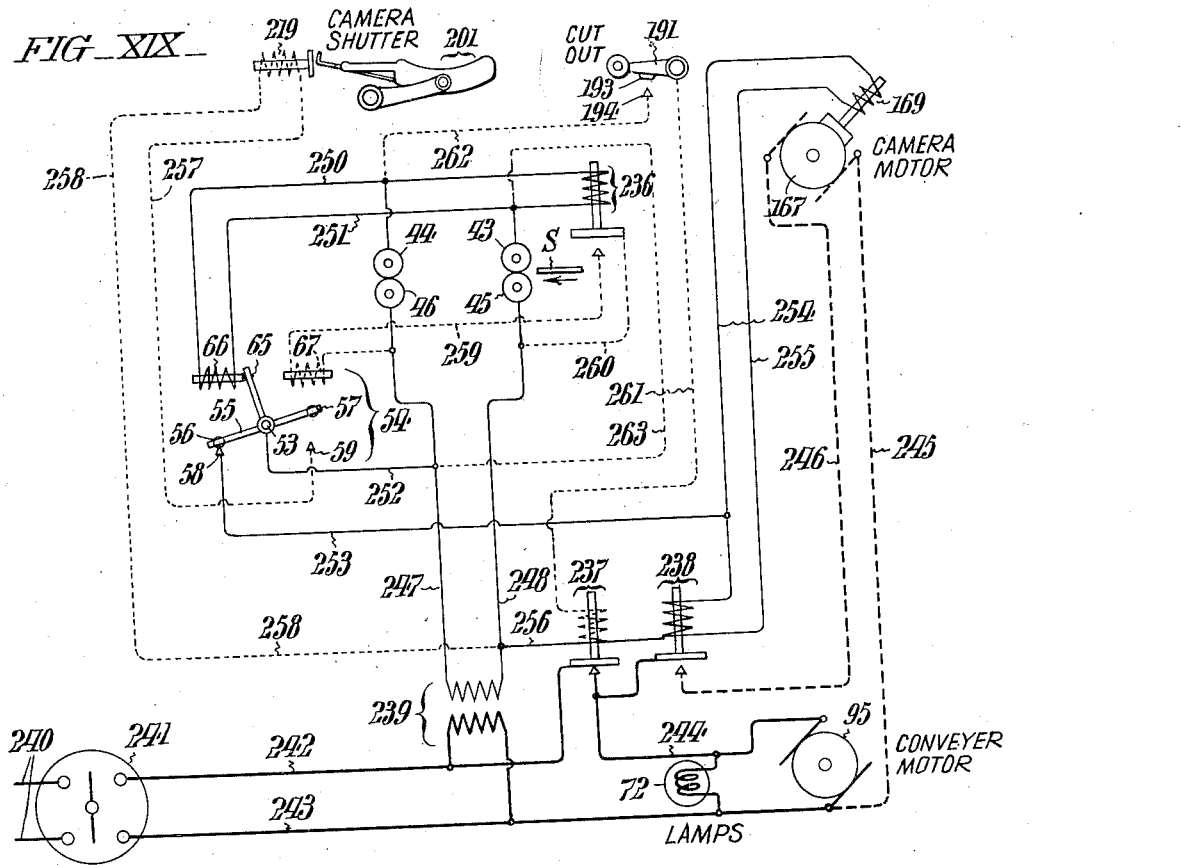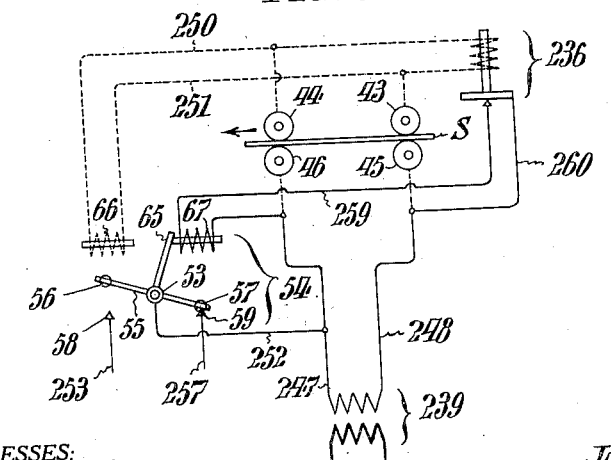

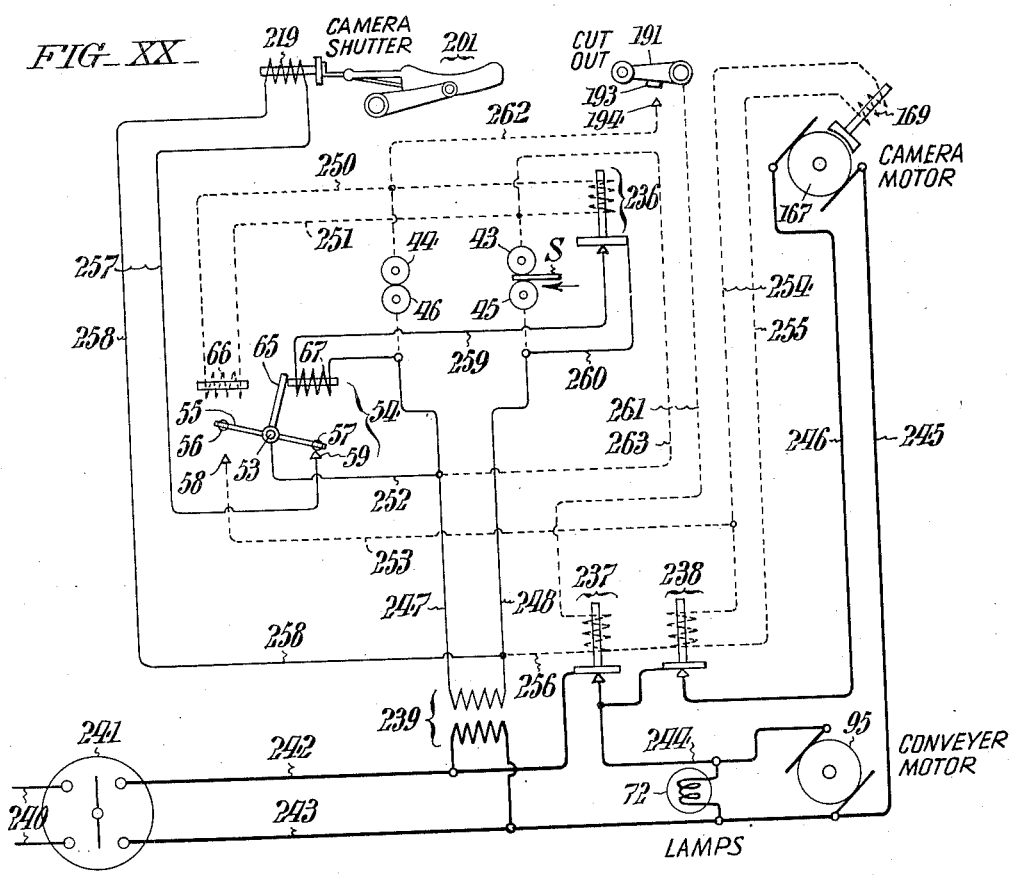
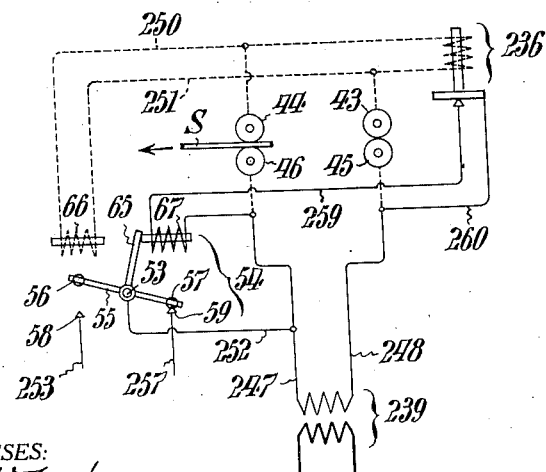

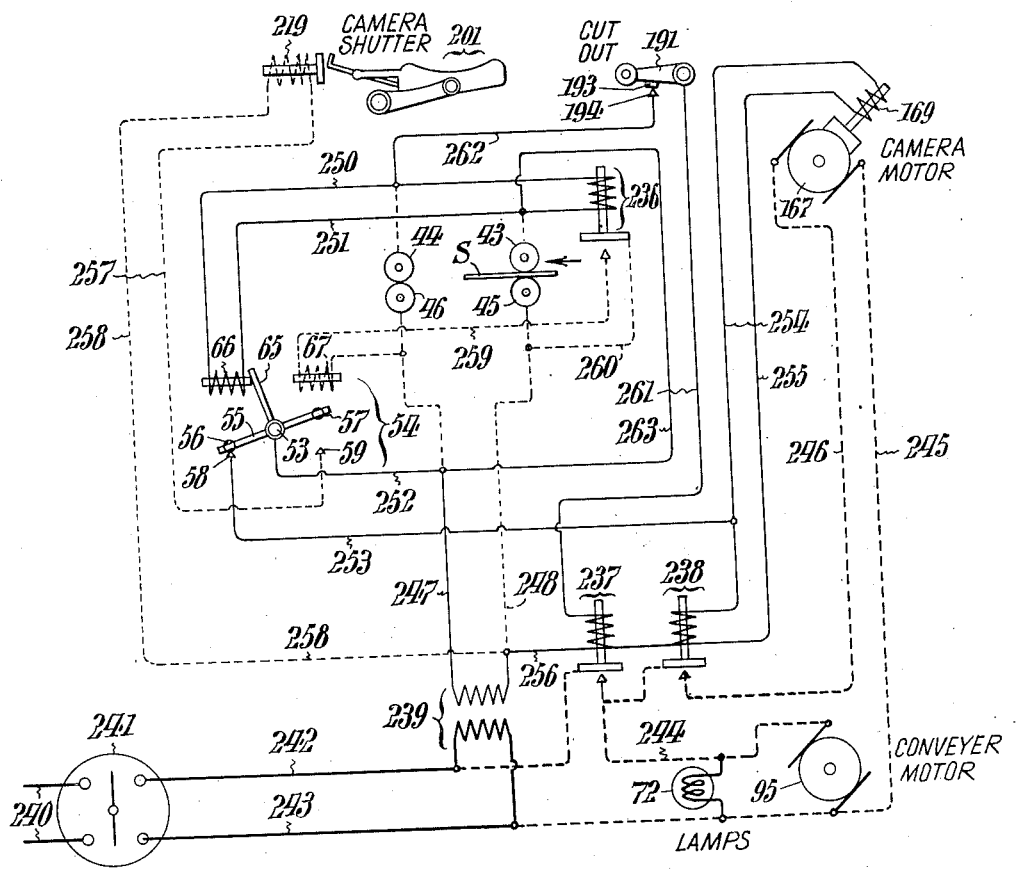

Patented Aug. 11, 1942

2,292,825

UNITED STATES PATENT OFFICE 2,292,825

PHOTOGRAPHIC REPRODUCTION APPARATUS

James J. Dilks, Jr., Haddon Heights, N. J.

Application May 12, 1939, Serial No. 273,204

23 Claims. (Cl. 88—24)

This invention relates to apparatus useful in making photographic reproductions of commercial and legal documents and other papers such as bank checks and drafts, agreements, assignments, maps, drawings, etc. More specifically, it has reference to photographic reproduction apparatus of the type in which a conveyer means advances the sheets which are to be photographed past the lens of a camera for reproduction in succession upon a sensitized film.

The chief aim of my invention is to render apparatus of the kind referred to completely automatic in operation, thereby to obviate the necessity for the exercise of special skill on the part of the attendant in charge of the same, and to insure the utmost economy in film consumption.

The above object I attain in practise as hereinafter more fully disclosed, through provision of automatic control means whereby, as each sheet is introduced into the conveying means of the apparatus, a means for moving the film in the camera is started, the lens shutter of the camera is opened; and whereby, upon advance of the sheet beyond the range of the lens, the film progressing means is stopped and the lens shutter closed.

In connection with control means operative upon the above principle it is a further aim of my invention to provide means for producing a time lag to delay opening of the camera shutter for a sufficient interval at the initiation of each photographing cycle to enable the film progressing means to attain speed, and at the end of each cycle to delay closing of the lens shutter after stoppage of the film progressing means, so that the characters of a stationary indexing device which were concealed during passage of the sheet over them, to be photographed on the film immediately adjacent the image of the sheet.

Another object of my invention is to make it possible, through provision of simple and reliable means for the purpose, to vary the speed of the conveying means relative to the means by which the film is progressed in the camera.

Another object of my invention is to facilitate arrangement of the apparatus for the photographing of sheets of different sizes or for varying the size of the reproductions, which object I realize as also hereinafter more fully disclosed, through provision in connection with the conveyer speed regulating means, lens adjusting means and a means for positionally adjusting the camera relative to the conveyer, of scales having correspondingly numbered graduations for coordinative setting of these elements.

Another object of my invention is to enable the apparatus to be adapted for use of ribbon film of different nominal sizes.

Further objects and attendant advantages will appear from the following detailed description of the attached drawings wherein Fig. I is a view in side elevation of a photographic recording apparatus conveniently embodying my invention.

Fig. II shows the apparatus in front elevation.

Fig. III shows the top plan view of the sheet conveying unit of the apparatus.

Fig. IV shows the conveying unit in inverted plan with a portion of one of the conveyer belts broken away to expose underlying parts which would otherwise be hidden.

Fig. V is a horizontal sectional view of the conveying unit taken as indicated by the angled arrows V—V in Fig. VI.

Fig. VI is a longitudinal section of the conveying unit.

Section VII is a detail sectional view taken as indicated by the angled arrows VII—VII in Fig. III and showing the lighting means by which the sheets are illuminated for photographing.

Fig. VIII is a fragmentary detail sectional view taken as indicated by angled arrows VIII—VIII in Fig. III.

Fig. IX is a fragmentary detail sectional view taken as indicated by the angled arrows IX—IX in Fig. IV.

Fig. IXa is a fragmentary view of a socket plate forming a part of the conveyer unit of the apparatus.

Fig. X is a fragmentary view in elevation looking as indicated by the angled arrows X—X in Fig. V.

Fig. XI shows the photographing unit or camera of the apparatus in side elevation with its front side swung down to expose the parts at the interior.

Fig. XII shows the camera in rear elevation.

Fig. XIII is a cross-sectional view of the camera taken as indicated by the angled arrows XIII—XIII in Figs. XI and XII.

Fig. XIV is a staggered cross-sectional view taken as indicated by the angled arrows XIV—XIV in Fig. XI.

Fig. XV is a detail section taken as indicated by the angled arrows XV—XV in Fig. XI.

Fig. XVI is a fragmentary detail view taken as indicated by the angled arrows XVI—XVI in Fig. XIII and showing the lens shutter of the camera in open position.

Fig. XVII is a view corresponding to Fig. XVI showing the shutter in closed position.

Fig. XVIII is a detail sectional view taken as indicated by the angled arrows XVIII—XVIII in Fig. XII.

Fig. XIX is a wiring diagram of the electrical appurtenances of the apparatus.

Figs. XX, XXI, XXII and XXIII are views like Fig. XIX showing the conditions which obtain in the various circuits during a single operating cycle of the apparatus.

As herein illustrated, my improved photographic reproduction apparatus includes conveyer unit 1 through which a sheet S which is to be photographed is progressed and a camera 2 which is supported centrally over the unit 1 by a carriage 3 having guidance for vertical adjustment on a column structure 4.

Referring now more particularly to Figs. I–X, it will be observed that the conveyor unit 1 has a pair of laterally spaced side frames 5, 5a with apertured feet 6 that take screw bolts 7 by which the unit is secured to a suitable supporting surface 8. Journalled in parallel relation in the side frames 5, 5a are transverse shafts 9 and 10 with grooved drums 11 and 12 about which a series of laterally-spaced endless horizontal main feed belts 13 are trained. As shown in Figs. IV and VI, the upper runs of the belts 13 overtravel a table 15 supported by the side frames 5, 5a in the interval between the drums 11 and 12, and are maintained taut by flanged idler pulleys 16 on an arm 17 capable of adjustment about a fixed stud 18 on one of said frames. With the belts 13 cooperate corresponding symmetrically-arranged auxiliary upper feed belts 19 and 20 which are respectively trained about grooved drums and flanged spool-like pulleys 21, 22 and 23, 24. The drums 21 and 23 are superposed upon and correspond in size with the drums 11 and 12, and are freely mounted on transverse shafts 25 and 26 passing through bearing blocks 27 and 28 which have guidance in vertical slots 29 and 30 in the side frames 5, 5a. Set screws 31 and 32 engaged in plates 33 and 34 bridging the tops of the slots 29 and 30, serve as means for regulating the pressure of the drums 21 and 23 upon the drums 11 and 12. The pulleys 22 and 24 are free on shafts 35 and 36 extending crosswise between arms 37 and 38 which are fulcrumed for free movement about sleeves 25a and 26a of the insulation on the shafts 25 and 26. As a consequence of this construction, the upper feed belts 19 and 20 rest by gravity upon the upper runs of the lower feed belts 13 and thus partake of the movement of the latter belts. The belts 19 and 20 are held taut by rollers 39 free on shafts 40 carried by arms 41 which are adjustable about rods 42 extending between the arms 37, 38 respectively. Secured to the pulleys 22 and 24 are metallic rollers 43 and 44 which bear upon opposing rollers 45 and 46 within the intervals between the belts 13 and 19, 20, the latter rollers being free on fixed transverse shafts 47 and 48. As shown, the shafts 47 and 48 are mounted in bearing blocks 49 of insulation affixed to the side frames 5, 5a. The rollers 43, 45 and 44, 46 operate as electric circuit control contacts in a manner later explained.

Disposed crosswise in the space between the rollers 22 and 24 for the upper belts 19 and 20 is a concaved plate 50 with central longitudinal exposure slit 51 of fixed width, and with upstanding arms 52 at its opposite ends affixed to a transverse rock shaft 53. Also secured to the rock shaft 53 is a horizontal rocking beam 55 of a double pole relay 54 with contact studs 56 and 57 in its ends adapted to over-ride contacts 58 and 59 set respectively into sectors 60 and 61 of insulation which are shiftable for adjustment about clamp screws 62 and 63 engaged in the side frame 5a. From Figs. V and X it will be noted that the shaft 53 extends through the side frame 5, and that to the protruding end thereof is secured a finger 65 which lies between the poles of a pair of spaced opposing electromagnets 66, 67 affixed to said frame.

Supported crosswise of the side frames 5, 5a above the belts 19 and 20 is a housing 70 which is centralized with respect to the aperture interval between the pulleys 22, 24 and within which are disposed at each side of the center, a plurality of lighting devices in the form of electric incandescent lamps 72. As shown in Figs. I, III and VIII, the housing 70 has a slit 73 in its top whereof the width is regulatable by means of a pair of laterally adjustable cover plates 74, said slit being guarded by downwardly-convergent shields 75 within the housing alongside the bulbs 72, see Fig. VII. As shown in Fig. VI, the housing 70 has end wings 76 which extend over the tops and downwardly of the sides of the drums 21 and 23 to enclose the latter as well as the other parts above the main feed belts 13. The sheets which are to be photographed are introduced into the apparatus over a table 77 supported by horizontal bracket extensions 79 of the side frames 5, 5a at the feed in end (right hand end in Figs. I and III) of the unit 1 at the level of the main feed belts 13. In order that sheets of different widths may be properly centralized relative to the feed belts 13, I have provided gauge means including a vertical guide plate 80 capable of selective registry with spaced longitudinal slots 81 in the top of the table 77 inward of one side edge thereof. As shown in Figs. III and VIII, the gauge plate 80 is secured to the inner end of a graduated shank bar 82 which passes through a fixed apertured bracket 83, and which is adjustably fixable in said bracket by a set screw 84.

Beneath the belts 13 is horizontal belt 85 (Figs. I and IV) which is trained about end drums 86 and 87 on shafts 88 and 89 journalled in extended bearing arms 90 and 91 at opposite ends of the side frames 5 and 5a. After passing through the unit 1 on the belts 13 in the direction indicated by the arrow in Fig. I, the sheets are diverted downwardly around the drum 12 by an arcuate deflector 92 onto the upper run of the belt 85 and by the latter returned inverted to the feed in end of the apparatus in the same order in which they were originally introduced. As shown, the deflector, 92 is supported by a rod 93 which is adjustable in horizontal slots 94 in the side frames 5, 5a.

The drive mechanism for the conveying unit 1 includes an electric motor 95 which is adjustably mounted on stud pins 96 projecting laterally from the side frame 5a, see Figs. I, II, IV, V and IX. A worm 97 on the shaft of the motor 95 meshes with a worm wheel 98 on a shaft 99 journalled at its opposite ends in parallel bars 100 which extend crosswise between the frames 5, 5a. Splined on the shaft 99 is a spur gear 101 which is confined between the arms of a shiftable yoke 102, said yoke also carrying a freely rotatable idler pinion 103 in mesh with said spur gear. The yoke 102 is swingable about the shaft 99, and at its free end supports a spring-pressed pin 105 adapted for selective registry with differently positioned socketed lugs 106 in a plate 107 on the frame 5a so that the idler 103 may be selectively meshed with a corresponding number of spur gears 108, 109, 110, 111 and 112 on a counter shaft 113 which also has bearing support in the cross bars 100. As shown in Fig. IXa, the socket lugs 106 of the plate 107 are consecutively numbered from one to 5. By means of miter gear couples 115 and 116, the belt drums 11 and 12 are synchronously rotated in opposite directions as indicated by the arrows in Fig. VI, from the counter shaft 113. The return belt 85 is operated through a train of spur gears 117 (Fig. IV) from the shaft 9 of the drum 12.

Disposed in a crosswise slot in the table 15 medially between the contact rollers 45, 46, is an indexing device 118 with openings 119 in the top of its casing through which are exposed in line with the slit 51 of the aperture member 50, date, hour and index characters, and a pair of arrow heads, see Fig. V. The indexing device 118 may be of any approved construction with manipulating knobs shown at 120 and 121 for setting it.

The camera 2, see Figs. XI–XVII has a horizontally elongated casing 125 with rounded ends and with a downward offset 126 centrally of its bottom. The side wall or door 127 of the camera is connected to the casing 125 at the bottom by a hinge 128 so that it may be swung downward for convenience of access to the interior for the purpose of film loading and removal. A pair of gravity latches 129 at the top of the casing 125 cooperate with depressable spring hooks 130 on the door 127 to normally hold the latter closed. Light tightness is insured by a felt lining 131 on the door 127. Affixed by screws to the bottom of the pendent offset 126 of the camera casing 125 is an internally threaded boss 132 into which a lens barrel 133 screws for the purposes of adjustment, the optical equipment consisting in this instance of three lenses 134; and incorporated with said lens barrel 133 is an adjustable iris diaphragm 135 which may be of any well known construction. Focusing is effected through coordination of a pointer 136 on the lens barrel 133 with graduations circumferentially of the base flange of the boss 132, see Figs. XI and XII, said graduations being consecutively numbered from one to five in correspondence with the numbering of the socket bosses 106 for adjustment of the change spaced gearing of the conveyer unit 1. Within the camera casing 125 at opposite ends are supply and receiving reels 137 and 138 for the film F on which the pictures of the sheets passed the unit 1 are taken; and between the reels at the center in a transverse plane through the lens axis is a toothed feed drum 139 for said film. As shown, the drum 139 has two sets of teeth 140, 141, one adjacent each end thereof, and is mounted, with capacity for being axially shifted, on a shaft 142 which passes rearwardly through a bearing 143 in the back wall 145 of the camera casing and which has additional support in a fixed bearing plate 146 spaced from said wall. The inner end 142a of the shaft 142 is square and by cooperation with screw studs 147 in the hub of the drum 139 with opposite faces of said end, said drum is held from independent rotation on said shaft. Secured axially of the rear of the drum 139 by screws 148 is a circumferentially grooved collar 149 which is engaged by shifting arms 150 pendant from a rock shaft 151. The rock shaft 151 is supported in bearing lugs 152 on the back wall 145 of the camera and extends through one end of the casing 125 to the exterior where it is provided with a manipulating handle 153. Slidably guided in the handle 153 is a pin 155 which is spring pressed and retractable by pull upon the knob at its upper end so that it may be selectively registered with spaced notches 156, 156a in a sector 157 affixed to the camera casing. The film F illustrated represents one of 35 mm. width for which the teeth 140 of the drum are used to engage the edge perforations at one side thereof with the film centered relative to the focal axis of the lens. When it is desired to use 16 mm. film, toothed drum 139 is shifted rightward in Fig. XIII by means of the handle 153 to a position predetermined by the notch 156a in the sector 157 whereby the teeth 141 are made available for the perforations along one edge of such film with the latter centered relative to the lens axis. The film reels 137, 138 are free to rotate on studs 158, 159 projecting forwardly from the back wall 145 of the camera casing and in order to be endwise shiftable compensatively with axial shifting of the drum 139 as above are, like the latter, provided at the rear with circumferentially grooved collars 160, 161 which are respectively engaged by additional shifting arms 162, 163 on the rock shaft 151. Positioned in the intervals between the reels 137, 138 and the toothed drum 139 are flanged idler rolls 164, 165 of a width suitable for the 35 mm. film. A similar but narrower pair of idler rolls 164a, 165a is provided for the smaller or 16 mm. film. The rolls 164, 164a, 165 and 165a revolve freely on fixed studs 166 projecting forwardly from the back wall 145 of the camera casing and function respectively to hold the films in engagement with the lower portion of the drum 139. The drive means for the camera (Figs. XII, XIII and XVIII) include an electric motor 167 which is attached to the back 145 of the camera casing 125 and has associated with it a brake 168 subject to an electro-magnet 169. A worm 170 on the shaft of the motor 167 meshes with a worm wheel 171 on a shaft 172 with journal support at opposite ends in the wall 145 and the bearing plate 146. Affixed to the shaft 172 is a spur pinion 173, which, through a spur gear 174 communicates motion at reduced speed to the shaft 142 whereon the toothed drum 139 is mounted. By means of an auxiliary train of spur gears 175, deriving motion from the spur gear 174, rotation is imparted at the proper speed to a shaft 176 which extends through the rear wall 145 of the camera casing and carries a grooved pulley 177 having a slip belt connection 178 with a pulley 179 attached to the film take-up reel 138. The film F is restrained from "ballooning" on the reel 137 by a gravity roller 180 (Fig. XI) which rests thereon and which is carried at the lower end of a rod 181 extending up through a guide boss 182 at the top of the camera casing 125. As shown, the rod 181 is graduated to function as a gauge visible at the exterior of the camera to indicate the amount of film supply on the reel 137. The toothed drum 139 is kept free of dust by means of a wiper shoe 183 (Figs. XI and XIII) with felt padding 184 having an upward shank 185 which is slidably engaged on the end of a supporting arm 186 secured to a fixed stud 187 on the rear wall 145 of the camera casing. A spring 188 whereof the pressure is regulatable by a thumb nut 189 on the shank 185, operates to keep the shoe 183 in light but firm contact with the surface of the drum 139. Rotation of the shoe 183 about the axis of the shank 185 is prevented by a guide rod shown at 190. Within the camera casing 125 below the reel 137 is a gravity arm 191 with a roller 192 engaged in a diverted loop L of the film F. Normally the arm 191 is held in raised position with a contact 193 thereon out of engagement with a corresponding contact 194 at the bottom of the camera casing. The purpose of this feature will also be explained later on.

The lens shutter of the camera consists of two horizontally-arranged vanes 195 and 196 (Figs. XI, XV, XVI and XVII) which are secured respectively to arbors 197 and 198 carried between the spaced side members 199, 200 of a small cradle 201 and which normally rest with their free ends overlapping in the focal axis of the lenses 134, on a rounded cam projection 202 at the end of a lever 203. Free to rotate about pins 204 extending crosswise of the cradle 201 are rollers 205 which normally bear against the film F as shown in Fig. XVI to hold it snug against the bottom of the drum 139 with its edge perforations engaging the teeth on said drum. The cradle 201 is pivotally connected at its center to the ends of parallel arms 206 affixed to a sleeve 207, which is rockable and shifted axially on a fixed stud 209 projecting forwardly from the rear wall 145 of the camera casing. A sector 210, independently fulcrumed on the stud 209, is held to the casing wall 145 by a headed guide screw 211, and carries a lateral pin 212 which engages through a hole in the side member 199 of the cradle 201 so that the latter is held in a definite relation to said sector with capacity for sliding movement laterally relative thereto. The cradle 201 can thus adapt itself positionally to suit the two widths of film for the use of which the camera is designed. As shown, the sector 210 is subject to the pull of a spring 213 whereby the cradle 201 is normally held in elevated position after the manner shown in Fig. XVI with the rollers 205 holding the film pressed against the drum 139. Preparatory to loading the camera, the cradle 201 is depressed to the position shown in Fig. XVII to facilitate threading of the film, in which position it is yieldingly held through engagement of a round-ended spring-pressed latch pin 214 set into the rear casing wall 145, with a hole 215 in the sector 210. The actuating arm 203 for the shutter vanes 195, 196 is adjustably fixed to a sleeve 216 free on a pin 217 extending crosswise between rearward extensions 199a, 200a of the side frames 199, 200 of the cradle. A rearwardly extending arm 216a on the sleeve 216 supports an armature plate 218 adjacent the pole end of an actuating electromagnet 219. The width of the slit between the shutter vanes 195, 196 when the latter are in open position as in Fig. XVI is regulatable by means of taper ended set screws 220, 221 engaged in the side members 200 of the cradle 201. As shown, the screws 220, 221 project over the corresponding side edges of the shutter vanes 195, 196 to limit upward movement of said shutters under the action of the magnet 219. It is to be noted that the cam projection 202 of the arm 203 is stepped as at 202a to insure overlap of the shutter vanes 195, 196 as they move from closed position.

As shown in Fig. XII, the axis studs 158, 159 for the film reels 137, 138 project through the rear wall 145 of the camera casing and engage apertured bosses 224 at the tops of the inclined side bracket arms 225 of the carriage 3 (Fig. II). As a consequence of this construction, the camera 2 may be adjusted horizontally for proper centralization relative to the feed unit 1 and secured in adjusted position by set screws 226 (Fig. XII), which are threaded into the bosses 224 and adapted to engage the reel studs 158, 159. Affixed to each of the uprights 227 of the column structure 4 are toothed racks 228 which are engaged by pinions 229 on a cross shaft 230 journalled in the side members 225 of the carriage 3 and provided with a manipulating wheel or knob 231. By the means just described, the camera 2 may be adjusted up and down relative to the unit 1 to adapt the apparatus for the taking of pictures to different sizes. I have provided on the column structure 4 for coordination with a pointer 232 on the carriage 3, a scale 233 of which the graduations are numbered from one to five to correspond with the numbering of the socket bosses 161 of the conveyer unit 1, and of the graduations on the lens barrel 133.

Suspended from an intermediate tie rod 234 connecting the uprights 227 of the column structure 4 is a box 235 containing the relay switches and the transformer conventionally indicated at 236, 237, 238 and 239 respectively in the wiring diagrams of Figs. XIX, XX, XXI, XXII and XXIII. As shown in these diagrams, the current supply for the apparatus is taken from a power line 240 through a snap switch 241 wherefrom extend feed conductors 242, 243 across which the primary coil of the transformer 239 is connected. The lamps 72 and the motor 95 of the conveyer unit are connected in parallel between the conductor 243 and a branch conductor 244 which forms a continuation of the conductor 242 and in which the normally closed relay switch 237 is interposed. The camera motor 169 is interposed in a branch circuit of which the conductor 245 forms a continuation of the conductor 243 and of which the conductor 246 is connected to the conductor 244 with interposition of the normally open relay switch 238. Leading from the low voltage or secondary coil of the transformer 239 and extending to the two lower contact rollers 45 and 46 of the conveyer unit are conductors 247 and 278 of a secondary power circuit. The switch coil 66 of the double pole relay switch 54 and the coil of the relay switch 236 are interposed in an auxiliary circuit whereof the conductors 250, 251 which extend respectively to the upper contact coils 43, 44. Thus normally with the rollers 43, 45 and 44, 46 contacting, low voltage current flows through the conductors 247, 248, 250, 251 so that the bar 55 of the double pole relay is held by the coil 66 in the position shown in Fig. XIX with its contact 56 engaging the contact 58 to maintain the coil 169 of the camera motor brake and the coil of the relay 238 energized by flow of current from transformer 239 through another auxiliary circuit including a conductor 252 which extends to the pivot 53 of the double pole relay switch arm 55 and conductors 253, 254, 255 and 256. The actuating coil 219 of camera shutter is connected in another auxiliary circuit including a conductor 257 extending from the contact 59 of the double pole relay switch 54, a conductor 258 which connects with the conductor 248. The coil 67 of the double pole relay switch 55 is connected to the leads 247, 248 from the transformer through another auxiliary circuit including conductors 259, 260 with interposition of the relay switch 236. The camera cut out switch 193, 194, it will be observed, is connected with the coil of the relay switch 237 in still another auxiliary circuit including conductors 261 and 262 whereof the former joins the conductor 256 and the latter the conductor 250. The last mentioned circuit also includes a conductor 263 which extends from the contact roller 43 which joins with the conductor 252. In the diagrams, which show the conditions obtaining incident to successive steps in a single photographic cycle of the apparatus, the high voltage circuits are shown in heavy lines, the low voltage circuits in thin lines, the "live" circuits in full lines and the "dead" circuits in dotted lines.

The operation of the apparatus is as follows: Let it be assumed for example that a sheet measuring eight by ten inches is to be reproduced to a reduction of twenty diameters on 16 mm. film. Such reduction is predetermined by setting the camera at the position "2" on the scale 233 on the column 227 by adjusting the lens barrel 133 at the position "2," and by setting the speed for the conveyer unit at 2. With these preparations completed and the gauge 80 of the conveyer unit 1 properly adjusted, the switch 241 (Fig. XIX) is turned. As a result, current at high voltage will be supplied to the lights 72 and the motor 95 of the conveyer unit, by way of the conductor 242, the normally closed switch 237, the conductor 244 and the conductor 243. The sheet represented at S in the diagrams is placed on the feed in table 71 of the conveyer unit with one of its side edges abutting the gauge 80, and then pushed forward for engagement by the conveyer belts 13 and 19. As the sheet S advances and its leading edge enters between the contact rollers 43, 45 as shown in Fig. XX, the circuit 250, 251 is interrupted with attendant de-energization of the coil 66 of the double pole relay switch 54 and the coil of the relay switch 236. The latter switch 236 is thus permitted to close the circuit 259, 260 whereby the coil 67 energized to draw the arm 55 of the double pole relay 54 to the position shown in Fig. XX with incidental retraction of the contact 56 from the contact 58 and engagement of the contact 57 with the contact 59. Due to this change, it will be seen that the circuit 252, 253, 254, 255, 256 is interrupted so that the coils of the motor brake 167 and the switch 238 are de-energized to release the brake and the switch 238, which latter in closing permits current to flow to the camera motor 167 through the circuit 245, 246. It will be further seen that upon engagement of the contact 57 on switch arm 55 with the contact 59, current is permitted to flow to the coil 219 to open the camera shutter, the flow being by way of the conductors 252, 257 and 258. By adjusting the insulation sectors 60 and 61 (Figs. V and VI) which carry the contacts 58 and 59 of the double pole relay 54, it is possible to predetermine lapse of a short time interval between the separation of the contacts 56, 58 and the closing of the contacts 57, 59 so that the camera motor 167 may attain speed before the camera shutter is opened, the interval being such that the opening of the shutter occurs just as the leading edge of the sheet S reaches the slit 51 in the aperture plate 50. In its further travel through the apparatus the sheet S passes beneath the plate 50, Fig. V (which has been depressed by the clockwise turning of the switch arm 55 under the influence of the magnet 67), for exposure of its moving surface through the slit 51 to the camera lens and recording thereof upon the film F as the latter travels in the opposite direction as indicated by the arrows in Fig. XI. Entry of the leading edge of the sheet S between the contact rollers 44, 46 and the passage of the trailing end of said sheet beyond the contact disks 42, 45 does not entail any change in the control circuits as will be readily apparent from Figs. XXI and XXII respectively, so that the condition of said circuits remains as in Fig. XX. However, when the trailing end of the sheet S finally passes from between the rollers 44, 46, contacting of said rollers results in closing of the circuit 247, 250, 251, 248 whereby relay switch coils 236 and 66 are energized, causing opening of the relay switch 236 and swinging of the arm 55 of the double pole relay switch 54 back to the position shown in Fig. XIX. As a consequence the last described change, all the other circuits are restored to normal condition with the camera motor 167 stopped, its brake 169 applied, and camera shutter closed. Due to the adjustment of the contacts 58 and 59 as hereinbefore explained a time lag also occurs immediately before the termination of the photographic cycle. In other words, as the arm 55 of the double pole relay moves through its counter-clockwise or return swing, contact 57 leaves contact 59 before contact 56 reaches contact 58. Accordingly, the camera motor 167 is stopped a moment before closing of the camera shutter. During this interval, the characters of the index device 118 which were concealed from the camera lens during passage of the sheet beneath the slit 51 of the plate 50 exposed in the intervals between the belts 13 are photographed in the now stilled film F immediately to the rear of the impression of the sheet S. As the sheet passes from between the belts 13 and 20 at the drums 12 and 23, it is diverted downwardly by the curved deflector 92 and falls inverted upon the belt 85 whereby it is returned to the feeding end of the apparatus below the table 71. The foregoing operative cycle of the apparatus is repeated for each sheet introduced thereinto. The apparatus is thus entirely automatic in its operation and independent of the control of the attendant in charge thereof, the automatic stopping of the film and closure of the shutter immediately after advance of each sheet beyond the slit in the aperture plate insuring the utmost economy in film consumption.

In the event that the film F is ruptured or becomes exhausted, the roller arm 191 of the cut out in the camera will drop and thereby close the auxiliary circuit containing the coil of the normally closed switch 237, with resultant interruption of the current flow to the lamps 72, the conveyer motor 95 and the camera motor 167.

Having thus described my invention, I claim:

1. Photographic reproduction apparatus comprising a camera with a lens, a lens shutter, means for progressing photographic film crosswise of the lens, and a normally quiescent electric brake motor for driving the film progressing means; a moving conveyer for carrying the subject which is to be photographed across the range of the camera lens; and an electric circuit with switch means automatically operative upon entry of the subject into the field of the camera to first effect release of the motor brake and the initiation of current flow to the motor, then after the subject has advanced into the range of the lens to effect opening of the lens shutter; and finally after the subject has passed beyond the range of the lens to cause stoppage of current flow to the motor with brake application and closure of the lens shutter.

2. Photographic reproduction apparatus according to claim 1 further including an electric motor for driving the conveyer; electric lighting means for illuminating the subject; and an auxiliary circuit with incorporated switch means instrumental in the event of film rupture or exhaustion in the camera while a reproduction is being made, to cause interruption of current flow to the conveyer motor and the electric lighting means, as well as interruption of current flow to the camera motor, and closing of the lens shutter.

3. Photographic reproduction apparatus comprising a conveyer unit with a housing having a transverse slit aperture in one of its walls, and a plurality of laterally spaced conveyer belts to carry the subject which is to be photographed longitudinally through the housing past the slit; an indexing device with characters positioned in the intervals between the conveyer belts in line with the slit of the conveyer unit housing; a camera having a lens in line with the slit, normally quiescent means for progressing sensitized film crosswise of the lens, and a lens shutter; and control means automatically operative upon entry of the subject into the housing to first start the film progressing means, then upon advance of the subject into the range of the slit, to open the lens shutter, then after the subject has passed beyond the range of the slit, to stop the film progressing means, and finally after the lapse of a short time interval sufficient for photographing the then exposed characters of the indexing device to close the lens shutter.

4. Photographic reproduction apparatus comprising a conveyer unit with a housing having apertures in one of its walls, and, means for conveying the subject which is to be photographed through the housing past the aperture; a camera having a lens in line with the aperture and the conveyer unit housing, normally quiescent means for progressing sensitized film crosswise of the lens, and a lens shutter; control means automatically operative incident to passage of the subject through the housing to start and stop the film progressing means, and to open and close the lens shutter; and means controlled by the film in the camera and operative in the event of film rupture or exhaustion to effect stoppage of the conveying means and the film progressing means, and closure of the lens shutter.

5. Photographic reproduction apparatus comprising a conveyer unit with a housing having a slit transversely of its top, a main conveying element for conveying a sheet which is to be photographed longitudinally of the housing beneath the slit, superposed elements respectively at opposite sides of the vertical plane through the slit cooperating with the main conveying element in advancing the sheet, a plate overlying the main conveying element in the interval between the auxiliary conveying elements and having a slit in line with the slit of the housing through which the face of the sheet is exposed as it passes through the housing, devices within the housing to opposite sides of the plate for illuminating the portion of the sheet exposed through the slit in said plate, and light shields extending downward of the illuminating devices from opposite sides of the slit aperture in the top of the housing; and a camera above the conveyer unit having a lens in line with the slit in the housing, means for progressing sensitized film crosswise of the lens, and a lens shutter; and control means for starting and stopping the film progressing means and opening and closing lens shutter of the camera incident to passage of the sheet through the apparatus.

6. Photographic reproduction apparatus according to claim 5, in which the width of the exposure slit in the plate is fixed; and including adjustable means whereby the width of the slit aperture in the housing may be regulated.

7. Photographic reproduction apparatus according to claim 5, including means whereby the plate is normally supported clear of the main conveying element; and means automatically operated as the sheet enters the apparatus to depress the plate for the purpose of holding down the sheet on the main conveying element in the interval between the two auxiliary conveying elements.

8. Photographic reproduction apparatus comprising a conveying unit with a housing having a transverse slit in its top; a conveying element for horizontally advancing sheets to be photographed longitudinally of the housing beneath the slit; a table adjacent an opening in one end of the housing through which the sheets are introduced in succession, and gauge means adjustable transversely of the table for centering sheets of different widths relative to the conveying means; a camera above the housing having a lens in line with the slit in said housing, normally quiescent means for progressing sensitized film crosswise of the lens, and a lens shutter; and control means operative incident to passage of each sheet through the housing to start and stop the film progressing means, and to open and close the lens shutter.

9. Photographic reproduction apparatus comprising a conveyer unit with a housing having a transverse slit in its top, a horizontal conveyer for advancing sheets which are to be photographed longitudinally of the housing beneath the slit, an opening in one end of the housing through which the sheets are introduced, a return conveyer horizontally disposed beneath the first mentioned conveyer, a deflector for directing the sheets downwardly onto the return conveyer after they have traversed the housing in one direction, and an opening in the housing wall aforesaid through which the sheets are successively discharged by the return conveyer; a camera above the conveyer unit having a lens in line with the exposure slit in the conveyer unit housing, normally quiescent means for progressing sensitized film crosswise of the lens, and a lens shutter; and control means automatically operative incident to passage of each sheet through the housing to start and stop the film progressing means, and to open and close the lens shutter.

10. Photographic reproduction apparatus according to claim 9, including means whereby the speed of the conveying means of the conveyer unit may be varied relative to that of the film progressing means of the camera.

11. Photographic reproduction apparatus according to claim 17, further comprising means for supporting the camera unit with capacity for up and down adjustment in relation to the conveyor unit.

12. Photographic reproduction apparatus according to claim 17, wherein the camera is provided with means whereby the lens may be focally adjusted to correspond with positional changes of the camera relative to the conveyer unit; and wherein the conveyer unit includes a drive which is regulatable for speed to give the proper time exposure for different positional adjustments of the camera.

13. Photographic reproduction apparatus according to claim 17, wherein the camera has lens adjusting means with numbered scale graduations; and wherein there is a scale with correspondingly numbered graduations for predetermining positions of the camera on the support to accord with the different focal adjustments of the lens.

14. Photographic reproduction apparatus according to claim 17, wherein the camera has lens adjusting means with numbered scale graduations; wherein there is a scale with correspondingly numbered graduations for predetermining positions of the camera unit on the support to accord with the different focal adjustments of the lens; and wherein the conveyer unit includes regulatable drive means with a control member which is shiftable to different positions numbered to correspond with the numbers of the lens and camera adjusting scales to properly regulate the speed of the conveyer with that of the film to give the proper time exposure for the focal setting of the lens.

15. Photographic reproduction apparatus according to claim 17, wherein the camera is provided with supply and take up reels for ribbon film which are adjustable as to width to enable use of ribbon films of different sizes.

16. Photographic reproduction apparatus according to claim 17, wherein the camera is provided with supply and take up reels for ribbon film which are adjustable as to width to enable use of ribbon films of different sizes, and with means enabling focal adjusting of the lens to correspond with changed positions of the camera relative to the conveyer unit; and wherein the conveyer unit includes a drive which is regulatable for speed to give the proper time exposure for different focal and positional adjustments of the camera.

17. Photographic reproduction apparatus comprising a conveyer unit with a housing having an aperture in its top, a horizontally arranged endless main conveyer belt for carrying a sheet which is to be photographed through the housing, and a pair of horizontally arranged endless conveyer belts contacting with the main belt from above to assist in conveying said sheet, said auxiliary belts being arranged in spaced relation, one in advance of and the other rearward of the aperture with respect to the direction of sheet travel; a camera above the conveyer unit having a lens in line with the aperture of the conveyer unit housing, means for progressing sensitized film crosswise of the lens, and a lens shutter; and control means automatically operative incident to passage of the sheet through the conveyer housing to start and stop the film progressing means of the camera, and to open and close the shutter.

18. Photographic reproduction apparatus comprising a conveyer unit with a housing having an aperture in one of its walls, and enclosing means for carrying a sheet which is to be photographed through the housing together with means for illuminating the sheet; a camera having a lens in line with the aperture in the conveyer unit housing, means for progressing sensitized film crosswise of the lens, a normally quiescent motor for driving the film progressing means, and a normally closed lens shutter with electromagnetic actuating means, circuits including said motor and shutter; and control means for said circuits including pairs of metallic contact elements between which the sheet passes, said elements being arranged within the housing of the conveyer unit at opposite sides of the vertical plane of the aperture for automatically governing the circuits to affect starting of the camera motor and opening and closing of the lens shutter as the sheet enters between the first pair of contacts in the direction of conveyance, and stopping of the camera motor and closing of the shutter when the sheet passes beyond the second pair of the contacts.

19. Photographic reproduction apparatus according to claim 18, in which the contact elements are in the form of opposing rollers.

20. Photographic reproduction apparatus comprising a conveyer unit with a housing having an exposure aperture in its top, and means for carrying a sheet which is to be photographed horizontally through the housing; a camera above the conveying unit having a lens in line with the exposure aperture in the conveyer unit housing, means for progressing sensitized film crosswise of the lens, a normally quiescent electric motor for driving the film progressing means, and a normally closed lens shutter with associated electro-magnet actuating means; a power circuit containing the camera motor and a normally open relay switch, and automatic control means including a double pole relay with two sets of switch contacts, one pair normally open and the other normally closed, an auxiliary circuit connected across the secondary circuit controlled by the normally closed contacts of the double pole relay and containing the coil of the motor switch, a normally open auxiliary circuit connected across the secondary power circuit and containing one of the coils of the double pole relay, pairs of contact disks within the housing of the conveyer unit respectively in advance and in the rear of the aperture with respect to the direction of conveyer travel between which the sheet is adapted to pass, said disk pairs being respectively interposed in the flow and return conductors of the secondary power circuit beyond the two auxiliary circuits aforesaid, another auxiliary circuit connected to the secondary power circuit and containing the other coil of the double pole relay switch and the coil of a magnetic switch for the normally open auxiliary circuit aforesaid, whereby, as the sheet enters between the first pair of contact disks, the camera motor is started and the shutter opened automatically, and when the sheet passes beyond the second pair of contact disks, the camera motor is stopped and the shutter closed automatically.

21. Photographic reproduction apparatus according to claim 20, in which the contacts of the double pole switch are adjustable to produce a time lag whereby the opening of the shutter is slightly delayed to permit the motor to come up to speed before the leading edge of the sheet enters the range of the exposure aperture.

22. Photographic reproduction apparatus according to claim 20, in which the conveyer means of the conveyer unit is driven by an electric motor; wherein the conveyer motor is connected in a power circuit with a normally closed relay switch; wherein another auxiliary circuit connected to the secondary power circuit contains the coil of the conveyer motor relay switch and normally open contacts which close in the event that the film in the camera is ruptured or exhausted, with attendant stoppage of the camera and conveyer motors and closure of the shutter.

23. Photographic reproduction apparatus according to claim 20, wherein the camera motor has a normally applied electromagnetic brake, and wherein the coil of the brake is connected in the same auxiliary circuit as the coil of the normally open relay switch for the camera motor.

JAMES J. DILKS, Jr.